H. DUTCHER.
CAR-STARTER.
No. 187,111. Patented Feb. 6, 1877.
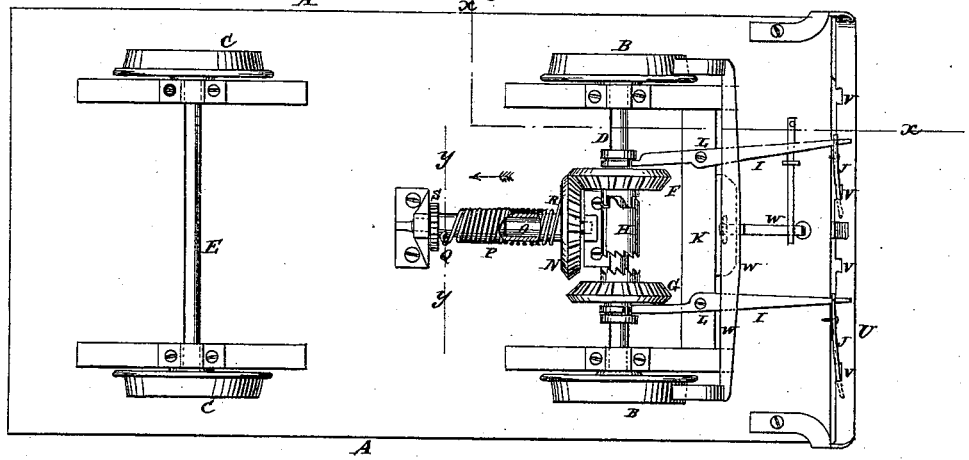

UNITED STATES PATENT OFFICE.

HENRY DUTCHER, OF PORT JERVIS, NEW YORK.

IMPROVEMENT IN CAR-STARTERS.

Specification forming part of Letters Patent No. 187,111, dated February 6, 1877; application filed January 18, 1875.

*To all whom it may concern:*

Be it known that I, HENRY DUTCHER, of Port Jervis, Orange county, New York, have invented a new and useful Improvement in Car-Starters, of which the following is a specification:

The invention will first be fully described, and then pointed out in the claim.

Figure 1 represents the under side of the car, showing the starting mechanism. Fig. 2 is a vertical section of Fig. 1 on the line $xx$. Fig. 3 is an outside view of the end of the car, showing the levers by means of which the gear-wheels are thrown in and out of gear; and Fig. 4 is a vertical section looking to the left from the line $yy$, showing the holding-ratchet and pawl.

Similar letters of reference indicate corresponding parts.

A represents the car. B B are the forward wheels, and C C the rear wheels. D is the forward axle; E, the rear axle. It is designed to apply this power to both ends of the car when desired, so that the term "forward" simply indicates the direction in which the car is moving. F and G are sliding-clutch bevel-wheels on the axle D. H is a clutch-sleeve, made stationary on the axle. The wheels F and G are thrown in and out of gear with the sleeve and the third gear-wheel by means of the horizontal levers I I and upright levers J J. The fulcrums of the levers I I are on the cross-timber K at the points L L. The fulcrums of the levers J J are at the points M M on the front end of the car. N is a third bevel-wheel, with which the two bevel-wheels F and G are made to engage. O is a shaft, which is placed at right angles with the axle, and opposite the center of the stationary sleeve H. This shaft is supported on end bearings by stands attached to the bottom of the car. P is a spiral spring on the shaft O, one end of which is confined in the shaft, as seen at Q; the other end is confined to the wheel N, as seen at R. S is a ratchet on the shaft O, and T is a spring-pawl, which engages therewith. This ratchet and pawl prevent the shaft from revolving when the spring is being wound up.

As seen in the drawing, the wheel N is being revolved by the wheel F, and the spiral spring is being wound up around the shaft O. When sufficient tension has been imparted to the spring, the wheel G is slipped into gear with the sleeve and the wheel N, and the power stored up in the spring is held for an indefinite space of time.

When it is desired to start the car the wheel F is thrown out of gear, which allows the spring to react and exert its force on the axle.

This reactive power is sufficient to start the car forward, and thereby materially assist the horses in getting the car under the usual headway. In the hand-rail U of the end of the car are notches V, for receiving the levers J J, and holding the gear-wheels F G either in or out of gear. W represents the ordinary brake, which is operated by the foot, as represented in Fig. 2. This brake may be used, as occasion requires, on down grades, or at other times.

Having thus described my invention, I claim as new and desire to secure by Letters Patent—

1. Car-axle A, provided with fixed double clutch H, in combination with sliding clutches for engaging therewith, bevel-wheels F G, rigidly secured on said sliding clutches, third wheel N, spring P, shaft O, operating-levers I I and J J, and notched hand-rail U, substantially as and for the purpose set forth.

2. Car-axle A, provided with fixed sleeve or double clutch H, in combination with sliding clutches for engaging therewith, bevel-wheels F G, rigidly secured on said sliding clutches, third wheel N, spring P, and shaft O, substantially as set forth.

HENRY DUTCHER.

Witnesses:
T. B. MOSHER,
ALEX. F. ROBERTS.